(12) United States Patent
Asakage et al.

(10) Patent No.: US 7,098,549 B2
(45) Date of Patent: Aug. 29, 2006

(54) POWER CONTROL DEVICE FOR CONSTRUCTION MACHINE

(75) Inventors: Tomohiko Asakage, Hiroshima (JP); Hideki Kinugawa, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 10/542,762

(22) PCT Filed: Dec. 12, 2003

(86) PCT No.: PCT/JP03/15929

§ 371 (c)(1),
(2), (4) Date: Jul. 20, 2005

(87) PCT Pub. No.: WO2004/065150

PCT Pub. Date: Aug. 5, 2004

(65) Prior Publication Data

US 2006/0061106 A1    Mar. 23, 2006

(30) Foreign Application Priority Data

Jan. 21, 2003  (JP) .............................. 2003-012647

(51) Int. Cl.
*F02N 11/06*   (2006.01)
*G06F 7/00*    (2006.01)
*B60H 1/32*    (2006.01)

(52) U.S. Cl. .................... 290/40 R; 62/133; 62/243; 701/36

(58) Field of Classification Search ............. 290/40 C, 290/40 A, 51, 34; 701/36, 50; 123/198 R, 123/198 DB, 198 DC; 62/133
See application file for complete search history.

(56) References Cited

U.S. PATENT DOCUMENTS

| | | | |
|---|---|---|---|
| 6,595,180 B1 * | 7/2003 | Thompson et al. | ... 123/198 DB |
| 6,854,286 B1 * | 2/2005 | Bureau et al. | ................. 62/244 |
| 6,895,917 B1 * | 5/2005 | Itoh et al. | ................. 123/179.4 |
| 6,981,544 B1 * | 1/2006 | Iwanami et al. | ............ 165/202 |
| 2001/0010261 A1 | 8/2001 | Oomura et al. | |
| 2001/0047659 A1 * | 12/2001 | Nakamura et al. | ............ 62/190 |
| 2002/0059019 A1 * | 5/2002 | Nakao et al. | ................. 701/22 |
| 2003/0097852 A1 * | 5/2003 | Tomita et al. | ................. 62/244 |

FOREIGN PATENT DOCUMENTS

| | | |
|---|---|---|
| EP | 1 213 166 A1 | 6/2002 |
| JP | 2000-096627 | 4/2000 |

(Continued)

OTHER PUBLICATIONS

U.S. Appl. No. 10/542,762, filed Jul. 20, 2005, Asakage et al.

(Continued)

*Primary Examiner*—Julio Gonzalez
(74) *Attorney, Agent, or Firm*—Oblon, Spivak, McClelland, Maier & Neustadt, P.C.

(57) ABSTRACT

A power control device for a construction machine of the present invention is characterized by including an engine, an actuator adapted to be driven with power of the engine, an engine controller for stopping the engine automatically when it is not necessary to drive the actuator, and an air conditioner for conditioning the air in an interior of a cab of the construction machine, and in which when an air conditioner operation detecting unit detects that the air conditioner is in operation and even when an engine power necessity determining unit determines that the power of the engine is not necessary, automatic stop of the engine by the engine controller is prevented.

6 Claims, 9 Drawing Sheets

FOREIGN PATENT DOCUMENTS

JP  2000-127755  5/2000
JP  2001-041069  2/2001

OTHER PUBLICATIONS

U.S. Appl. No. 10/544,225, filed Aug. 2, 2005, Umezu.
U.S. Appl. No. 10/543,695, filed Jul. 28, 2005, Asakage et al.
U.S. Appl. No. 10/543,341, filed Jul. 25, 2005, Kamon et al.
U.S. Appl. No. 10/542,656, filed Jul. 19, 2005, Umezu et al.
U.S. Appl. No. 10/543,108, filed Jul. 22, 2005, Asakage et al.
U.S. Appl. No. 10/544,779, filed Aug. 8, 2005, Kamon et al.
U.S. Appl. No. 10/542,245, filed Jul. 15, 2005, Asakage.
Patent Abstracts of Japan, JP 2000-096627, Apr. 4, 2000 (reference previously filed in Japanese language on Jul. 20, 2005).

* cited by examiner

POWER CONTROL DEVICE FOR CONSTRUCTION MACHINE

TECHNICAL FIELD

The present invention relates to a power control device for a construction machine such as a hydraulic excavator or a crane.

BACKGROUND ART

In Japanese Patent Laid-Open Nos. 2000-96627 and 2001-41069, there is disclosed a construction machine having an auto-stop function for stopping an engine automatically upon establishment of preset auto-stop conditions (e.g., a state in which a gate lever for opening and closing a gateway for operator is opened and a lever for operating a working actuator is not operated).

However, in the construction machine having such an auto-stop function and with an air conditioner installed within a cab, since a compressor of the air conditioner is directly connected to the engine, the compressor becomes unable to be driven upon automatic stop of the engine and a cooling capacity of the air conditioner is eventually lost. Therefore, for example in the summer season, when the operator leaves the construction machine without turn-off of an ignition key and returns after a while, an interior of the cab may be no longer comfortable because of a rise in internal temperature, thus making it impossible for the operator to enter the cab and resume operation, with consequent deterioration of a working efficiency.

DISCLOSURE OF THE INVENTION

It is an object of the present invention to provide a power control device for a construction machine which can appropriately perform air conditioning of an interior of a cab of the construction machine even upon return of an operator after leaving the construction machine without turn-off of an ignition key.

According to the present invention, there is provided a power control device for a construction machine including an engine, an actuator adapted to be driven with power of the engine, engine stop means for stopping the engine automatically when it is not necessary to drive the actuator, and an air conditioner for conditioning the air in the interior of the cab, the power control device comprising engine power necessity determining means for determining whether the power is necessary or not, air conditioner operation detecting means for detecting whether the air conditioner is in operation or not, and air conditioner operation maintaining means for maintaining at least a state of minimum operation of the air conditioner when the air conditioner operation detecting means detects that the air conditioner is in operation and even when the engine power necessity determining means determines that the power is not necessary.

According to this configuration, when it is detected by the air conditioner operation detecting means that the air conditioner is in operation, at least a state of minimum operation of the air conditioner is maintained even when it is determined by the engine power necessity determining means that power is not necessary. Thus, there is no fear that a cooling capacity of the air conditioner is lost. Therefore, even when the operator who has left the construction machine without turn-off of the ignition key returns after a while, the interior of the cab is kept comfortable and the operator can start operation immediately, thus leading to improvement of a working efficiency.

The air conditioner may be driven by the power and the air conditioner operation maintaining means may be configured so as to prevent the engine from stopping by the engine stop means when the air conditioner operation detecting means detects that the air conditioner is in operation and even when the engine power necessity determining means determines that the power is not necessary. According to this configuration, the air conditioner continues be driven by the engine and its cooling capacity is maintained.

The power control device may be provided with an auxiliary power source which generates a smaller power than the power of the engine and the air conditioner operation maintaining means may be configured so as to drive the air conditioner with the power of the auxiliary power source when the air conditioner operation detecting means detects that the air conditioner is in operation. According to this configuration, the air conditioner continues to be driven by the auxiliary power source and therefore the cooling capacity of the air conditioner is maintained. Moreover, fuel cost is saved due to a difference in fuel consumption between the engine and the auxiliary power source.

On the other hand, since a blower fan of the air conditioner usually rotates with electric power supplied from a battery which is charged by an alternator driven by the engine, the blower fan continues to rotate even upon automatic stop of the engine. If the engine automatically stops in such a state, the blower fan continues to be driven while the battery is not charged, so that the battery over discharges and runs out. In this case, in order to prevent a long-time interruption of work for charging the battery, it is preferable to adopt the following configuration.

The power control device may be provided with a battery and the air conditioner has a blower fan driven with electric power supplied from the battery and is configured so that the engine is stopped automatically by the engine stop means when the engine power necessity determining means determines that the power is not necessary. Further, the air conditioner operation maintaining means is configured so as to stop an operation of the blower fan upon lapse of a predetermined time after the engine is stopped. In this case, since the blower fan of the air conditioner continues to rotate for only such a degree of time for preventing exhaustion of the battery, the interior of the cab is kept comfortable by blowing of air with the blower fan while avoiding exhaustion of the battery.

The power control device may be provided with a battery and battery supply electric power detecting means for detecting a residual quantity of electric power supplied by the battery and the air conditioner may have a blower fan driven with the electric power supplied from the battery and may be configured so that the engine is stopped by the engine stop means when the engine power necessity determining means determines that the power is not necessary. Further, the air conditioner operation maintaining means may be configured so as to stop an operation of the blower fan when the battery supply electric power detecting means detects that the residual quantity of the electric power supplied by the battery is smaller than a predetermined value. In this case, since the blower fan of the air conditioner continues to rotate for as long as possible while preventing the battery from running out, the interior of the cab is kept comfortable by the blowing of air with the blower fan while avoiding exhaustion of the battery.

BEST MODE FOR CARRYING OUT THE INVENTION

Embodiments of the present invention will be described hereinunder with reference to the drawings.

(a) FIRST EMBODIMENT

Figure 1:
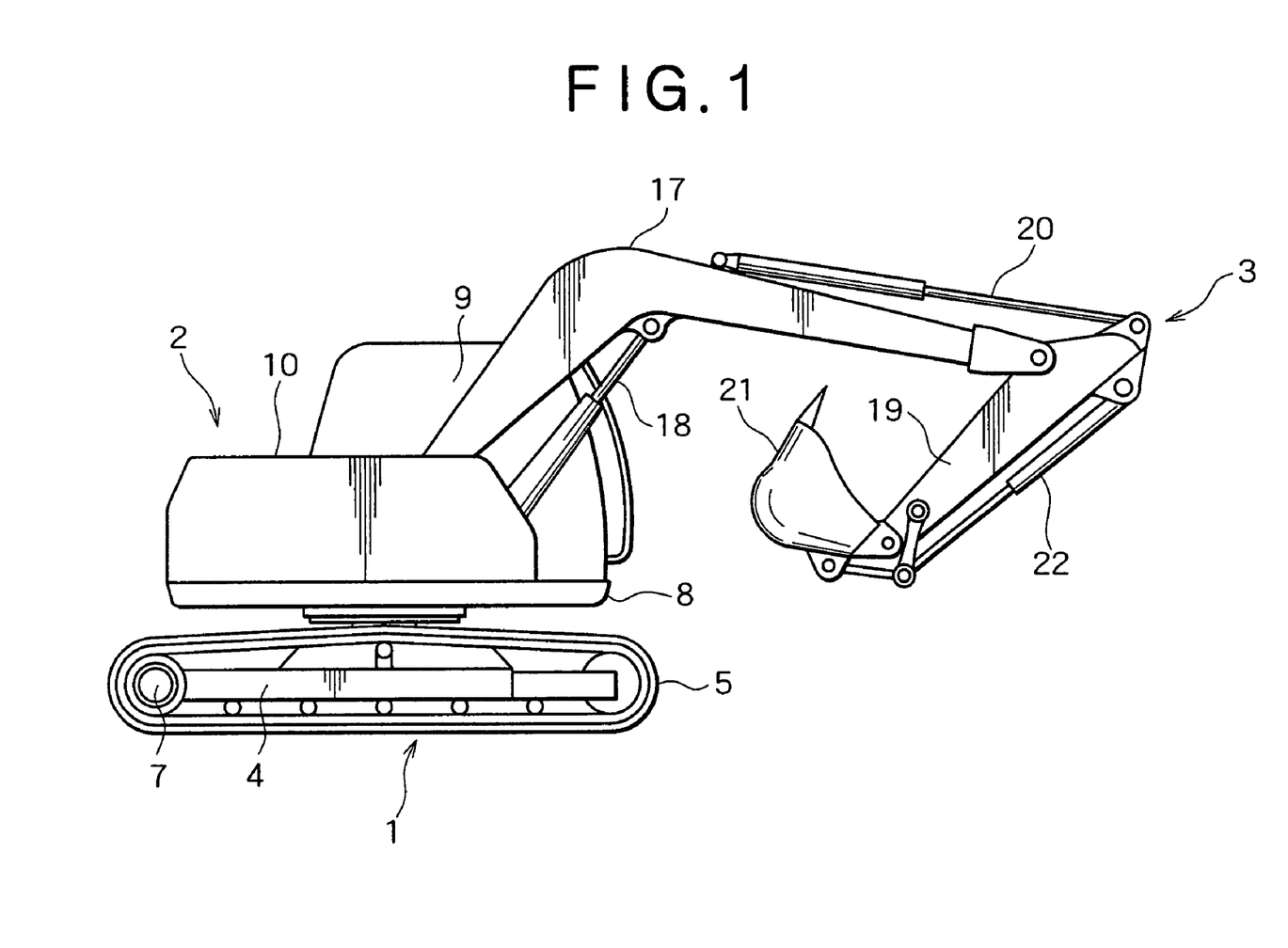
FIG. 1 is a diagram showing an entire configuration of a crawler type hydraulic excavator.

FIG. 1 is a diagram showing an entire configuration of a crawler type hydraulic excavator. As shown in the figure, a body of the hydraulic excavator as an example of a construction machine is made up of a lower traveling body 1 and an upper rotating body 2. An attachment 3 for excavation is attached to a front portion of the upper rotating body 2 so as to be raised and lowered freely.

The lower traveling body 1 comprises right and left crawler frames 4 and right and left crawlers 5, which are shown on only one side. The crawlers 5 are rotated independently by right and left traveling motors 7, causing the machine to travel. The upper rotating body 2 comprises a rotating frame 8, a cab 9 and a machine room 10. The cab 9 has a substantially hermetically sealed structure which is shut off from the outside air for protecting an operator from exterior noises, dust, etc. An air conditioner (not shown) is provided for ensuring comfortableness in the cab. The attachment 3 for excavation includes a boom 17, a boom cylinder 18 for raising and lowering the boom 17, an arm 19, an arm cylinder 20 for turning the arm 19, a bucket 21, and a bucket cylinder 22 for turning the bucket. The cylinders 18, 20 and 22 correspond to actuators respectively.

Figure 2:
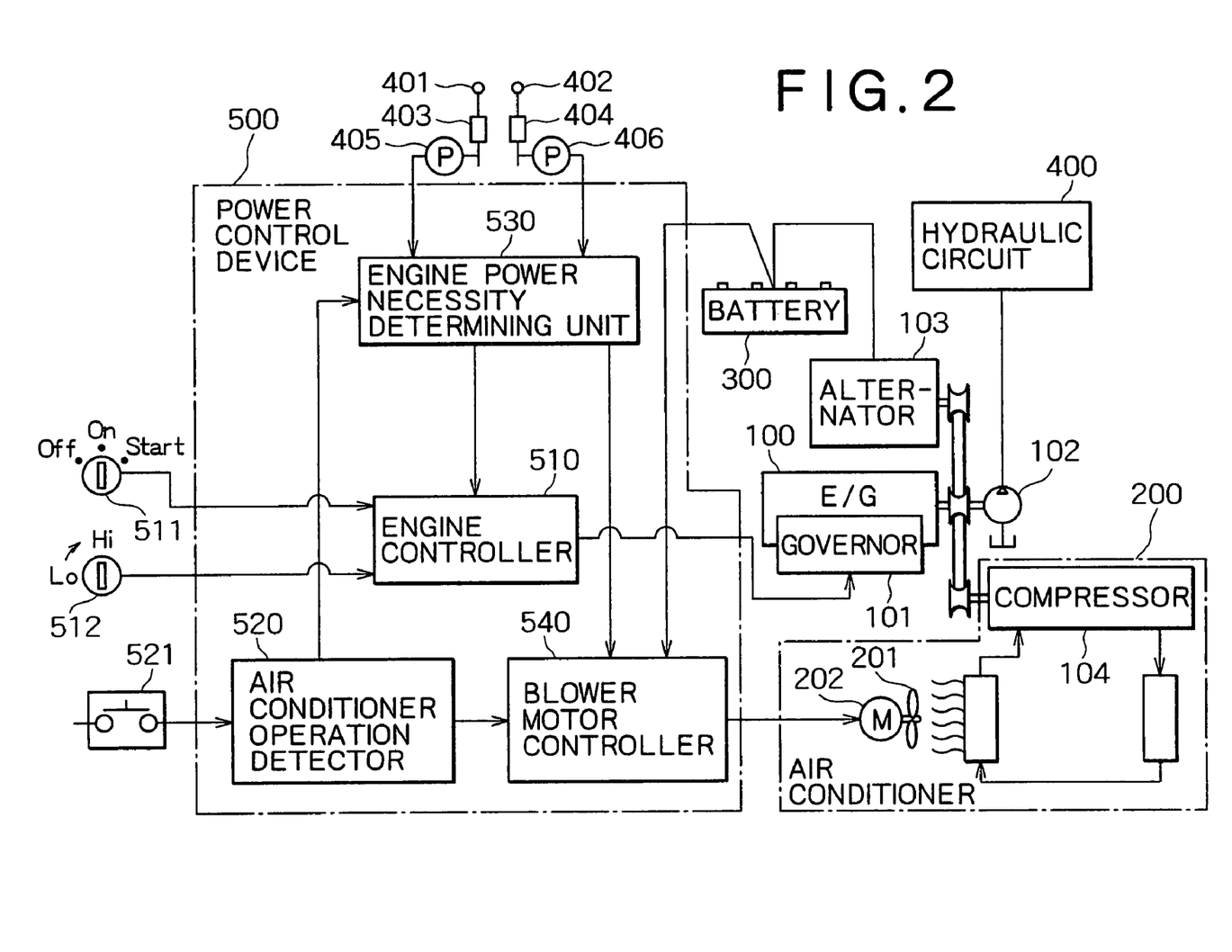
FIG. 2 is a functional block diagram of a power control device for the crawler type hydraulic excavator according to a first embodiment of the present invention and the vicinity thereof.

FIG. 2 is a functional block diagram of a power control device for the crawler type hydraulic excavator according to a first embodiment of the present invention and the vicinity thereof. In the same figure, the numeral 100 denotes an engine (E/G), numeral 200 denotes an air conditioner, 300 a battery, 400 a hydraulic circuit, and 500 a power control device.

Output of the engine 100 is controlled by a governor 101. A hydraulic pump 102 is directly connected to an output shaft of the engine 100. Further, an alternator 103 and a compressor 104 are connected to the engine output shaft through timing belts respectively.

For example, the air conditioner 200 is adapted to suitably mix hot air and cold air and blow off the resulting mixed air into the cab 9 with use of a blower fan 201 which is driven by a blower motor 202. Hot air is produced by utilizing engine cooling water or an electric heater provided separately, while cold air is produced by utilizing evaporation heat obtained upon evaporation of a refrigerant compressed by the compressor 104.

The battery 300 is, for example, a storage battery or Ultra Capacitor (trade name), to which electric power generated by the alternator 103 is charged. The blower motor 202 is driven with electric power supplied by discharge of the battery 300. Though not shown, the power control device 500 is operated with the electric power supplied from the battery 300.

In accordance with operation of operating levers 401 and 402 as operating means installed within the cab 9, in the hydraulic circuit 400 pressure oil from the hydraulic pump 102 is supplied to the boom cylinder 18, arm cylinder 20 and bucket cylinder 22 through control valves (not shown), causing those cylinders to perform protruding and retracting motions. For detection of related operation information, there are disposed pressure sensors 405 and 406 for detecting pilot pressures of remote control valves 403 and 404 which are adapted to operate in accordance with operation of the operating levers 401 and 402.

The power control device 500 is further provided with an engine controller (corresponding to the engine stop means) 510, an air conditioner operation detector (corresponding to the air conditioner operation detecting means) 520, an engine power necessity determining unit (corresponding to the engine power necessity determining means) 530, and a blower motor controller (corresponding to the air conditioner operation maintaining means) 540.

Upon issuance of an ON signal from an air conditioner switch 521 the air conditioner operation detector 520 detects that the air conditioner 200 is in operation. For example, the air conditioner operation detector 520 provides ON information indicating that the air conditioner 200 is in operation to both engine power necessity determining unit 530 and blower motor controller 540.

On the basis of information on operation of the operating levers 401 and 402 as operating means and operation information (e.g., ON information) provided from the air conditioner operation detector 520, the engine power necessity determining unit 530 determines whether the power of the engine 100 is necessary or not. When the operating levers 401 and 402 are operated, a certain work is being performed under operation of the boom cylinder 18, arm cylinder 20 and bucket cylinder 22, therefore, the engine power necessity determining unit 530 determines that the power of the engine 100 is necessary, and then issues an engine power need signal. On the other hand, when the operating levers 401 and 402 are not operated, no work is being performed, therefore, the engine power necessity determining unit 530 determines that the power of the engine 100 is not necessary, and then issues an engine power non-need signal. Instead of the operation information of the operating levers 401 and 402, whether a gate lever (safety lever) provided at a gateway of the cab 9 is opened or closed may be detected and the above determinations may be made using the detected information.

With an ON signal provided from a key switch 511, the engine controller 510 starts the engine 100, while with an OFF signal from the key switch 511, the engine controller 510 stops the engine 100. After start-up of the engine, the engine controller 510 issues a command signal to the governor 101 so as to control the engine output in accordance with information on operation of an accelerator 512, and upon receipt of the engine power non-need signal from the engine power necessity determining unit 530, the engine controller 510 stops the engine 100 automatically.

The blower motor controller 540 controls the operation of the blower motor 202 in accordance with both power necessity information provided from the engine power necessity determining unit 530 and ON information from the air conditioner operation detector 520. The blower motor 202 is adapted to be operated with electric power supplied from the battery 300.

Figure 3:
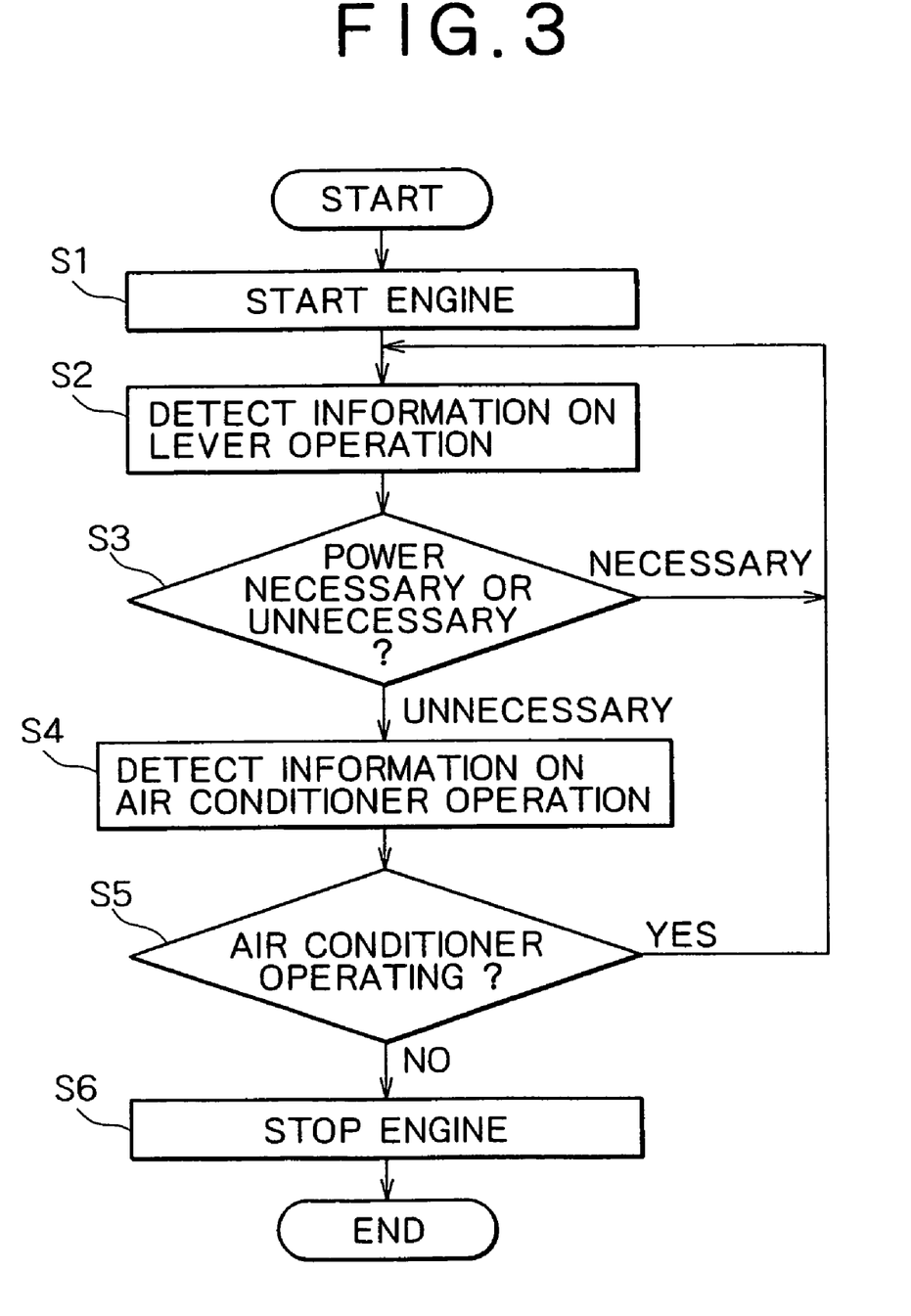
FIG. 3 is a flow chart showing an example of operation of the power control device according to the first embodiment.

FIG. 3 is a flow chart showing an example of operation of this device. A description will be given with reference to the same figure. First, when an operator turns the key switch 511 to Start position, the engine controller 510 issues a Start signal to start the engine 100 (Step S1). Thereafter, the key switch 511 returns to ON position automatically. With this position, if the operator turns the accelerator 512 from Lo to Hi, the engine controller 510 issues an accelerator signal and controls the engine output by changing a preset value for the governor 101. It goes without saying that, if the operator turns the key switch 511 to OFF position for manual stop, the engine 100 can be stopped immediately.

Next, when the operator operates the operating levers 401 and 402, pilot pressures of the remote control valves 403 and, 404 are detected by the pressure sensors 405 and 406 (Step S2) and the detected pilot pressures are inputted to the engine power necessity determining unit 530. Then, on the basis of the inputted pilot pressures, the engine power necessity determining unit 530 determines whether the power of the engine 100 is now necessary or not (Step S3). When the engine power necessity determining unit 530 determines that the power of the engine 100 is necessary, the processing flow returns to just after Step S1, but when the engine power necessity determining unit 530 determines that the power of the engine 100 is not necessary, the processing flow advances to the next step. That is, as long as the operator operates the operating levers 401 and 402, causing the boom cylinder 18, arm cylinder 20 and bucket cylinder 22 to perform protruding and retracting motions to carry out a certain work, the power of the engine 100 is necessary and therefore the processing flow does not advance to the next step. On the other hand, when the operator does not operate the operating levers 401 and 402, the power of the engine 100 for the work becomes unnecessary, so that it is possible to advance to the next step.

If the operator turns ON the air conditioner switch 521 (Step S4), the air conditioner 200 is driven. From this ON signal, the air conditioner operation detector 520 detects that the air conditioner 200 is in operation (Step S5). Upon this detection of operation of the air conditioner 200, the processing flow returns to just after Step S1, so that the automatic stop of the engine 100 by the engine controller 510 is prevented.

On the other hand, if the air conditioner switch 521 is turned OFF, the operating air conditioner 200 comes to a stop, so that the air conditioner operation detector 520 issues OFF signals of the air conditioner 200 to both engine power necessity determining unit 530 and blower motor controller 540. Then, the engine power necessity determining unit 530 issues an engine stop signal to the engine controller 510, causing the engine 100 to be stopped automatically by the engine controller 510 (Step S6). Upon this automatic stop of the engine 100 the compressor 104 stops automatically. At the same time, the engine power necessity determining unit 530 issues a blower motor stop signal to the blower motor controller 540, so that the blower motor 202 is also stopped automatically by the blower motor control means 540.

Thus, according to this first embodiment, when the air conditioner operation detector 520 detects that the air conditioner 200 is in operation, the automatic stop of the engine 100 by the engine controller 510 is prevented even when the engine power necessity determining unit 530 determines that the power of the engine 100 is not necessary. Therefore, the compressor 104 of the air conditioner 200 continues to be driven by the engine 100 and a cooling capacity of the air conditioner 200 is maintained. Consequently, even if the operator who has left a hydraulic excavator during execution of a work without turn-off of the ignition key returns after a while, the interior of the cab 9 is kept comfortable. Moreover, even when the blower fan 201 of the air conditioner 200 remains rotating, there is no fear of exhaustion of the battery 300 because the battery continues to be charged. As a result, the operator who returned to the hydraulic excavator can resume the work concerned immediately, that is, the working efficiency is improved.

In this first embodiment, the engine 100 is not automatically stopped during operation of the air conditioner 200. Therefore, when the operator leaves the hydraulic excavator frequently, it is preferable to give consideration to both decrease of fuel consumption and decrease of exhaust gas. A second embodiment of the present invention has been effected taking note of the point just mentioned above. The details thereof will be described below.

(b) SECOND EMBODIMENT

Figure 4:
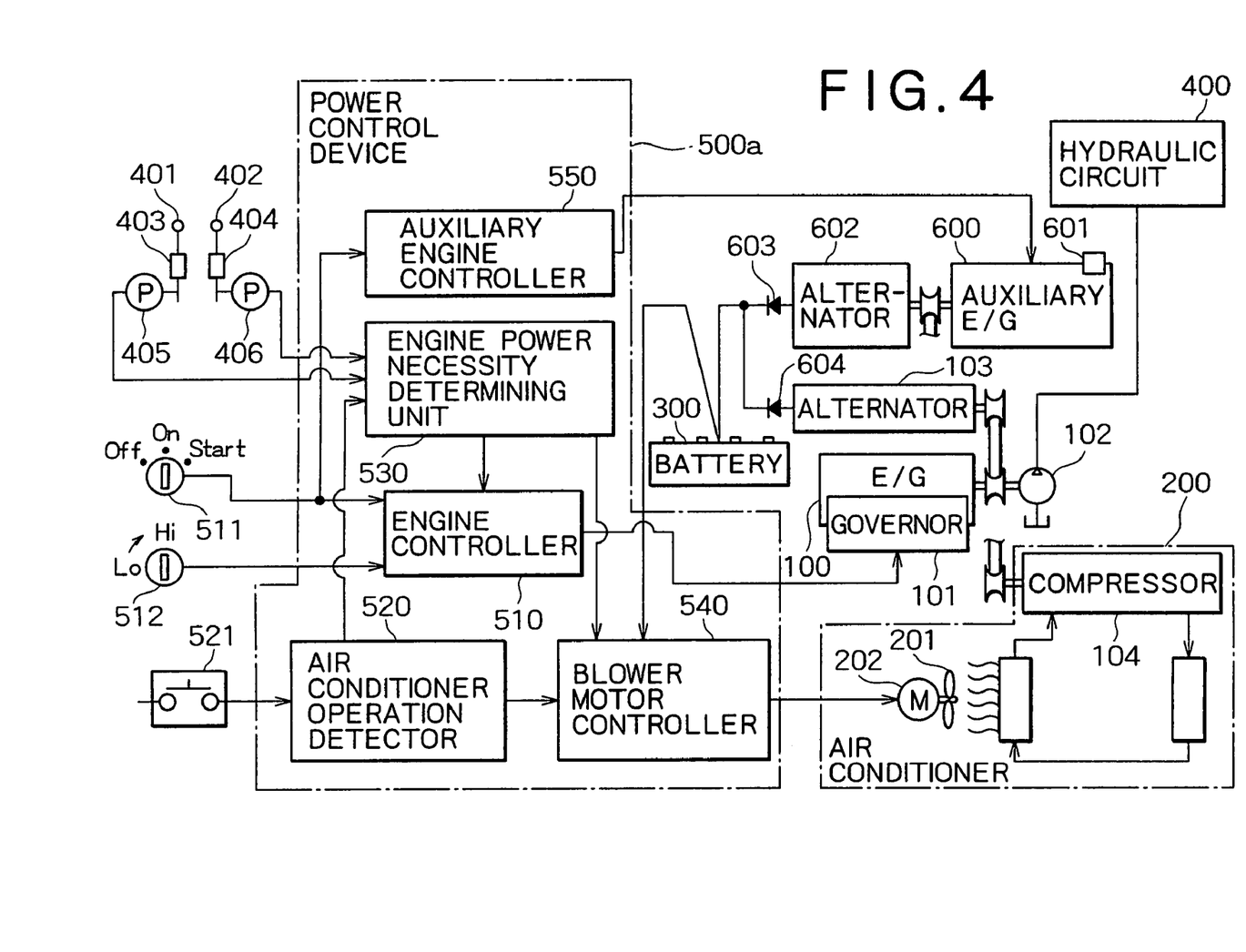
FIG. 4 is a functional block diagram of a power control device for the crawler type hydraulic excavator according to a second embodiment of the present invention and the vicinity thereof.

FIG. 4 is a functional block diagram of a power control device of a crawler type hydraulic excavator according to a second embodiment of the present invention.

Elements common to the first embodiment are identified by the same reference numerals as in the first embodiment and tautological explanations thereof will be omitted.

In FIG. 4, reference numeral 600 denotes an auxiliary engine (an example of the auxiliary power source). Power generated by the auxiliary engine, which is smaller than the power generated by the engine 100, is such a degree of power for permitting operation of the compressor 104 and blower motor 202 in the air conditioner 200. The output of the auxiliary engine 600 is controlled by a dedicated governor 601 and a generator (alternator) 602 is directly connected to an output shaft of the auxiliary engine 600. Further, the compressor 104 is connected to the output shaft of the auxiliary engine 600 (not the engine 100) through a timing belt. Thus, in this embodiment the compressor 104 is not connected to the output shaft of the engine 100. Since the electric power generated by the alternator 602 is charged to the same battery 300 as the battery to which the electric power generated by the alternator 103 is charged, elements (e.g., diodes) 603 and 604 for preventing the occurrence of a reverse current between the alternators are disposed at appropriate positions.

A power controller 500a used in this second embodiment is further provided with an auxiliary engine controller 550. Upon receipt of both an ON signal from the key switch 511 and a power non-need signal from the engine power necessity determining unit 530, the auxiliary engine controller 550 starts the auxiliary engine 600. Then, upon receipt of either an OFF signal from the key switch 511 or an OFF signal from the air conditioner operation detector 520 via the engine power necessity determining unit 530, the auxiliary engine controller 550 stops the auxiliary engine 600 automatically. Through the auxiliary engine controller 550, the compressor 104 is driven by the auxiliary engine 600 and the blower motor 202 is driven by the blower motor controller 540 to rotate the blower fan 201. Although in this embodiment the auxiliary engine 600 is controlled by the governor 601 so as to provide a constant output, it is possible to let the auxiliary engine possess its output adjusting function. Further, the auxiliary engine 600 may be substituted by another auxiliary power source such as a dedicated battery.

Figure 5:
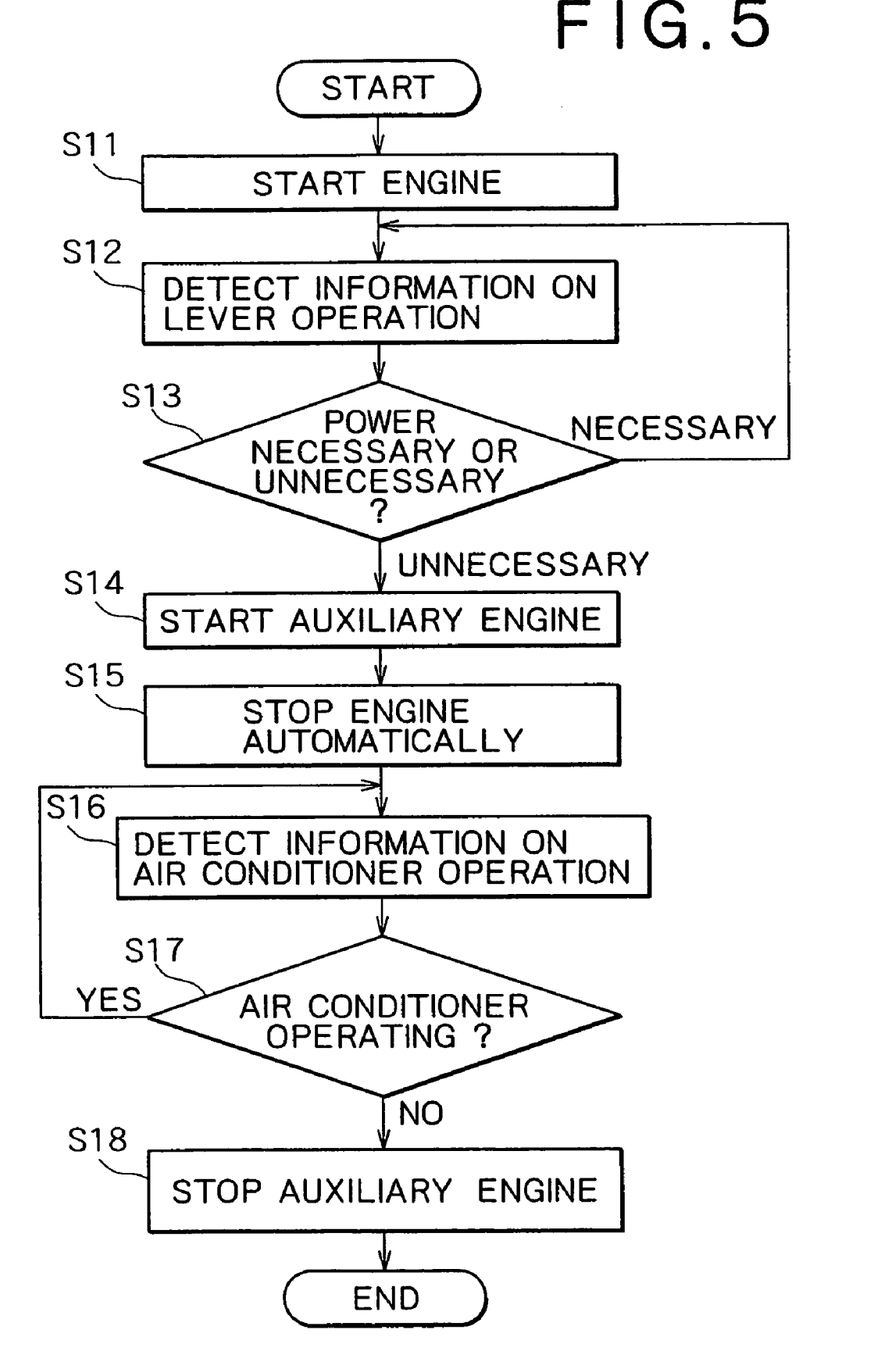
FIG. 5 is a flow chart showing an example of operation of the power control device according to the second embodiment.

FIG. 5 is a flow chart showing an example of operation of this device. A description will now be given with reference to the same figure. Steps S11 to S13 in the figure are the same as Steps S1 to S3 in the first embodiment. In this embodiment, however, when the engine power necessity determining unit 530 determines in Step S13 that the power of the engine 100 is not necessary, the auxiliary engine controller 550 starts the auxiliary engine 600 (Step S14). After start-up of the auxiliary engine 600, the engine 100 is stopped automatically (Step S15).

If the operator turns ON the air conditioner switch 521 (Step S16), the air conditioner 200 is driven. With this ON signal, the air conditioner operation detector 520 detects that the air conditioner 200 is in operation (Step S17). After this detection, the processing flow returns to just after Step S15.

On the other hand, if the air conditioner switch 521 is turned OFF, the operating air conditioner 200 comes to a stop, so that the air conditioner operation detector 520 issues OFF signals of the air conditioner 200 to both the engine power necessity determining unit 530 and the blower motor controller 540. Then, the engine power necessity determining unit 530 issues an engine stop signal to the auxiliary engine controller 550, and the auxiliary engine 600 is stopped automatically by the auxiliary engine controller 550 (Step S18). Upon this automatic stop of the auxiliary engine 600 the compressor 104 stops automatically. At the same time, since the engine power necessity determining unit 530 issues a blower motor stop signal to the blower motor controller 540, the blower motor 202 is also stopped automatically by the blower motor controller 540.

Thus, in this second embodiment, the auxiliary engine 600 which outputs a smaller power than that of the engine 100 is provided, and the air conditioner 200 is driven with the power of the auxiliary engine 600 when the air conditioner operation detector 520 detects that the air conditioner 200 is in operation. Therefore, the air conditioner 200 continues to be driven by the auxiliary engine 600 and the cooling capacity of the air conditioner 200 is maintained. Accordingly, even when the operator who has left the hydraulic excavator during execution of the work without turn-off of the ignition key returns after a while, the interior of the cab 9 is kept comfortable. As a result, the operator who has returned to the hydraulic excavator can resume the work immediately and hence the working efficiency is improved. Besides, fuel cost can be saved by the difference in fuel consumption between the engine 100 and the auxiliary engine 600. Accordingly, it is also possible to decrease the amount of exhaust gas emitted to the environment.

In the above embodiment, however, since the compressor 104 is not driven by the engine 100, a concurrent operation of the engine 100 and the auxiliary engine 600 is unavoidable and thus there still remains room for improvement with respect to the saving of fuel cost, etc. In this connection, it is proposed to adopt a configuration such that a clutch or a belt changer is used, and when the engine 100 is in operation, the compressor 104 is driven by the engine 100, while only during stop or idling of the engine 100, the auxiliary engine 600 is started and the compressor 104 is driven by the auxiliary engine 600. With this configuration, the fuel cost, etc is further improved. Further, if the power of the auxiliary engine 600 is not only used for driving the air conditioner 200 but also used as a substitute for the electric power for lighting, etc., it is possible to further improve the fuel cost, etc.

Although in both the first and second embodiments described above the whole air conditioner 200 is driven, even if only the blower fan 201 is rotated, the interior of the cab 9 can be kept comfortable to a certain extent. The following third embodiment has been adopted taking note of this point and will be described below.

(c) THIRD EMBODIMENT

Figure 6:
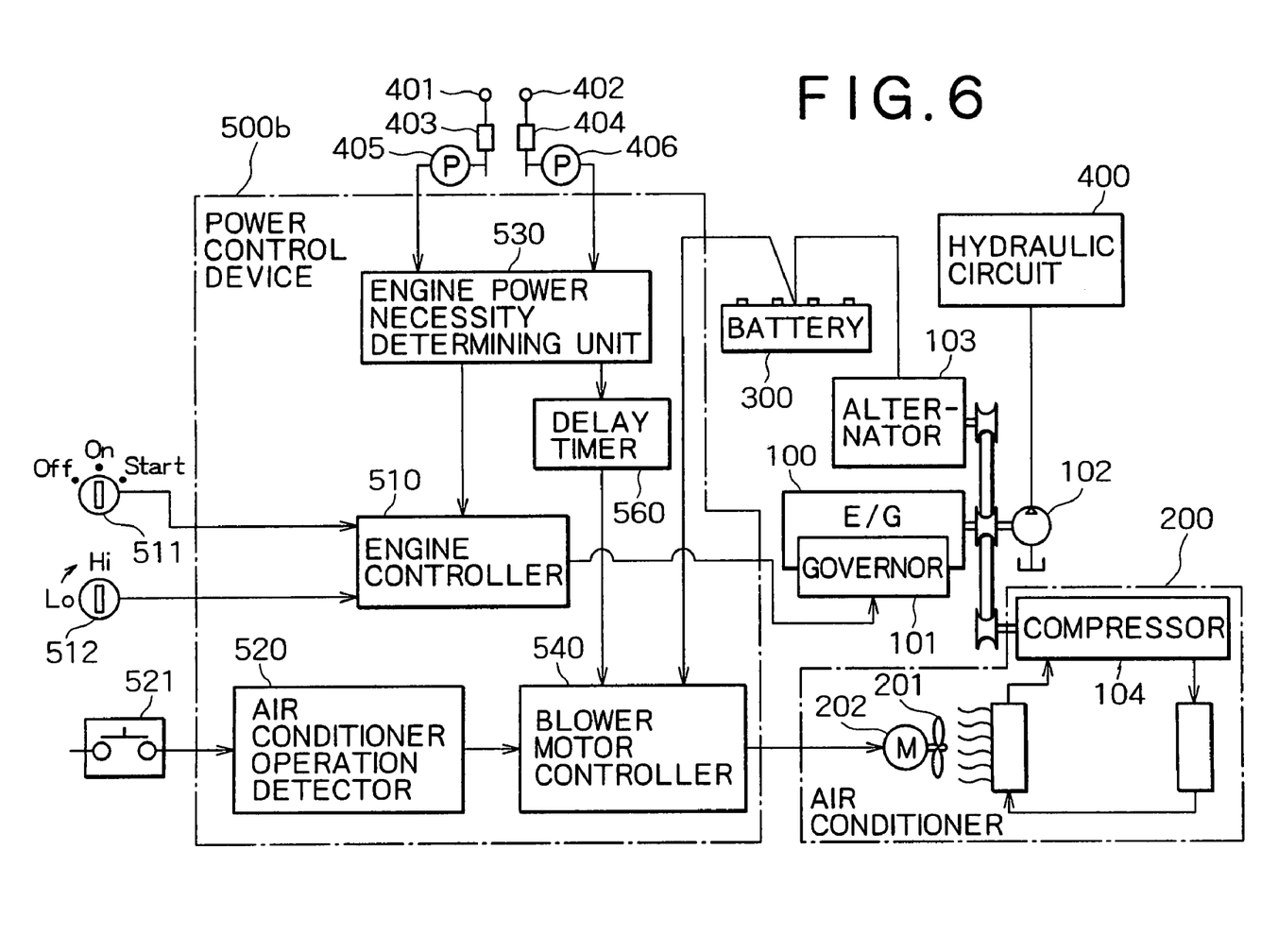
FIG. 6 is a functional block diagram of a power control device according to a third embodiment of the present invention and the vicinity thereof.

FIG. 6 is a functional block diagram of a power control device for a crawler type hydraulic excavator according to a third embodiment of the present invention. In this third embodiment, elements common to the first embodiment are identified by the same reference numerals as in the first embodiment and tautological explanations thereof will be omitted.

As shown in FIG. 6, a power control device 500b according to the third embodiment of the present invention is provided with a delay timer (corresponding to the air conditioner operation maintaining means) 560. The delay timer 560 is configured so that in accordance with a command provided from the engine controller 510 the blower motor controller 540 stops the operation of the blower fan 201 upon lapse of a predetermined time after stop of the engine 100.

Figure 7:
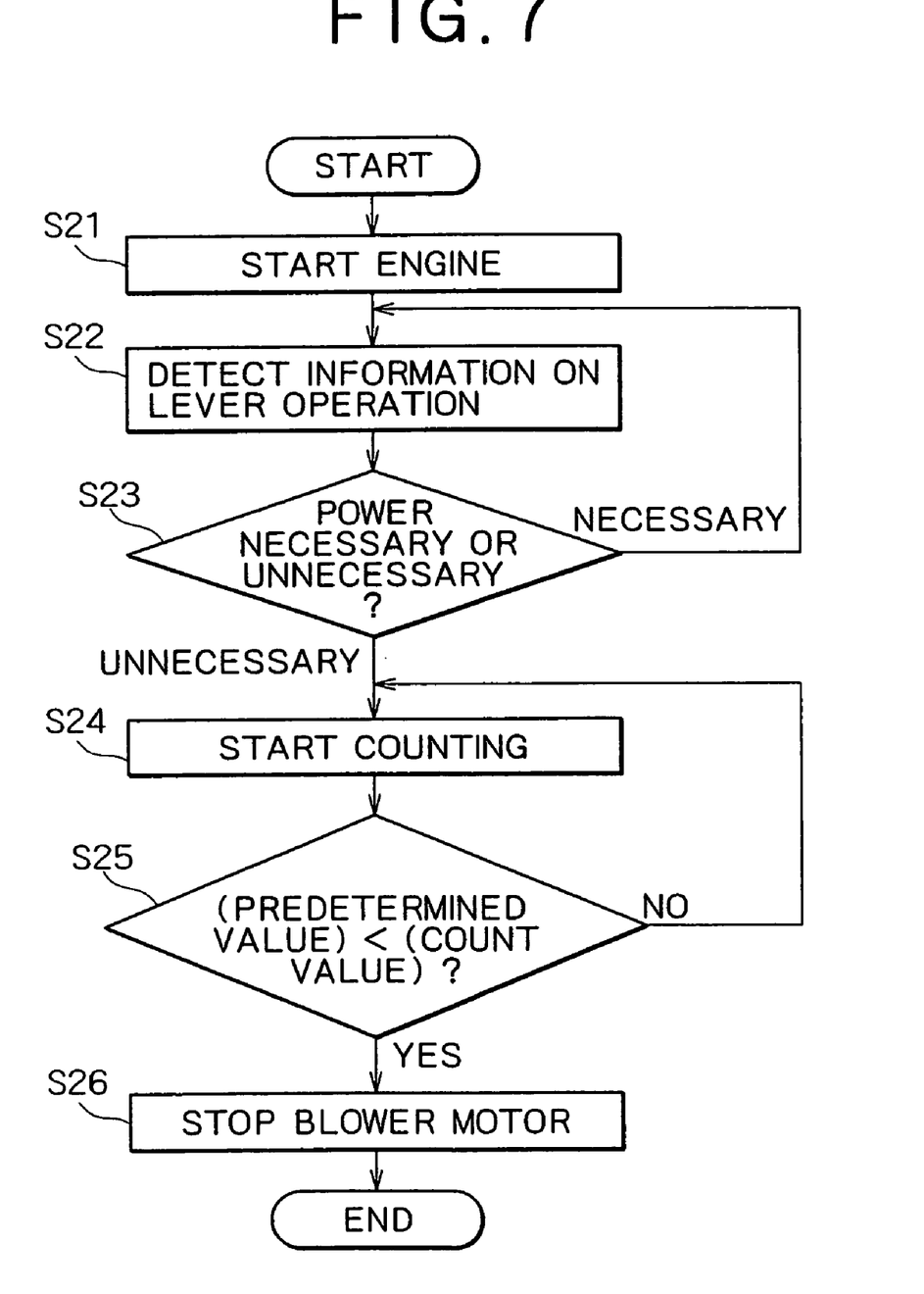
FIG. 7 is a flow chart showing an example of operation of the power control device according to the third embodiment.

FIG. 7 is a flow chart showing an example of operation of this device. A description will be given with reference to the same figure. In the power control device 500b, as shown in FIG. 7, subsequent to Steps S21 to S23 (corresponding to Steps S1 to S3 in the first embodiment), counting of the delay timer 560 is started (Step S24), and upon arrival of the count value at a predetermined value (Step S25), the blower motor 202 is stopped automatically (Step S26). Therefore, if the above predetermined value is set to such a degree of time for not exhausting the battery 300, the blower fan 201 of the air conditioner 200 continues to rotate for the set time, so that the interior of the cab 9 is kept comfortable by blowing of air with the blower fan.

In the case where the environment of the hydraulic excavator dramatically changes, the residual quantity of electric power in the battery 300 undergoes a great change, thus sometimes resulting in that it is necessary to set the delay timer 560 again. The following fourth embodiment has been adopted taking note of this point.

(d) FOURTH EMBODIMENT

Figure 8:
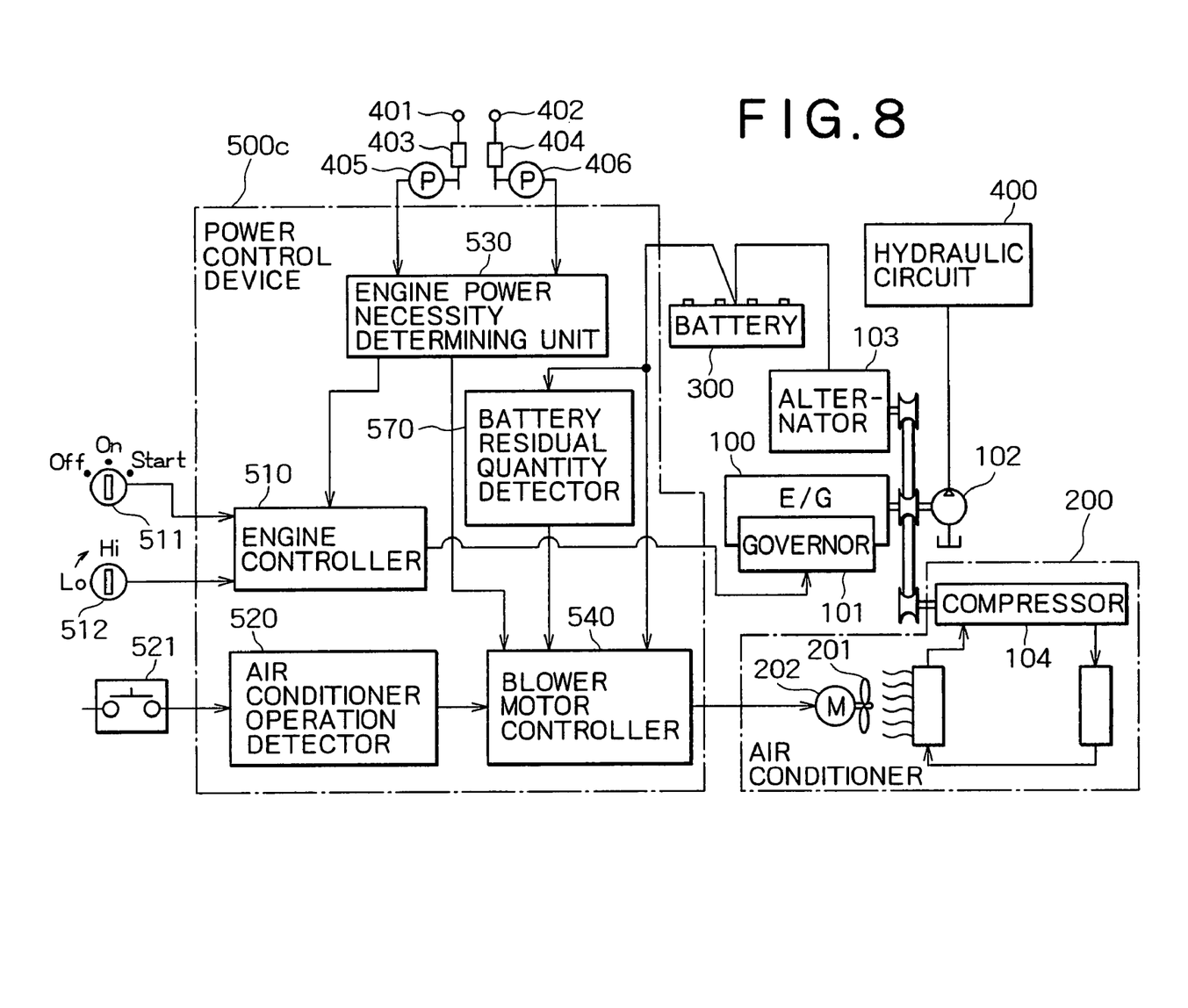
FIG. 8 is a functional block diagram of a power control device according to a fourth embodiment of the present invention and the vicinity thereof.

FIG. 8 is a functional block diagram of a power control device for a crawler type hydraulic excavator according to a fourth embodiment of the present invention. In this fourth embodiment, elements common to the first embodiment are identified by the same reference numerals as in the first embodiment and tautological explanations thereof will be omitted.

As shown in FIG. 8, a power control device 500c according to this fourth embodiment is provided with a battery residual quantity detector (corresponding to the battery supply electric power detecting means) 570 for detecting a residual quantity of electric power in the battery 300. The power control device 500c is configured so that when the blower motor controller (corresponding to the air conditioner operation maintaining means) 540 detects that the residual quantity of electric power in the battery detected by the battery residual quantity detector 570 is smaller than a predetermined value, the blower motor controller 540 stops the operation of the blower fan.

Figure 9:
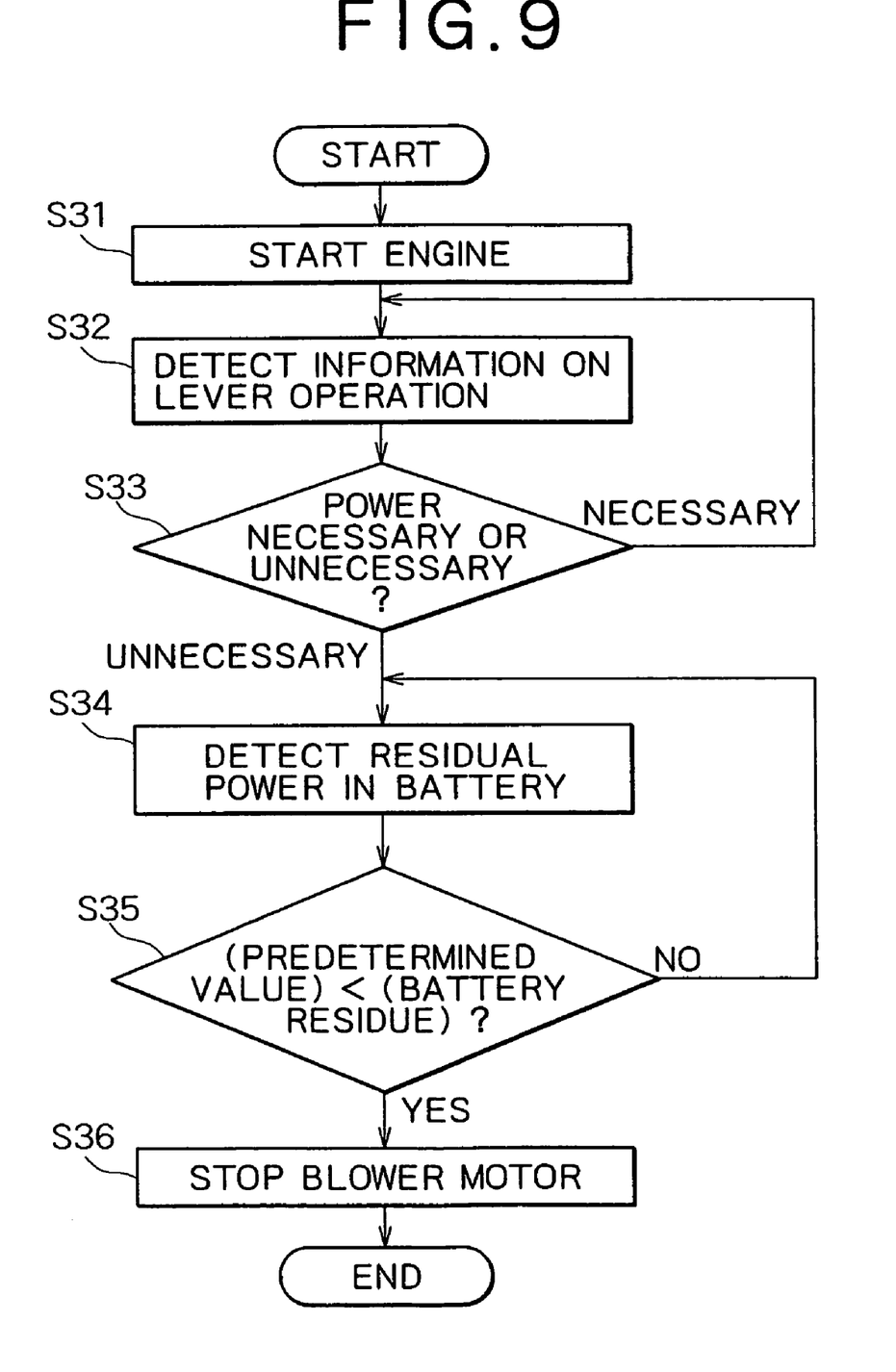
FIG. 9 is a flow chart showing an example of operation of the power control device according to the fourth embodiment.

FIG. 9 is a flow chart showing an example of operation of this device. A description will be given with reference to the same figure. In the power control device 500b, as shown in FIG. 9, subsequent to Steps S31 to S33 (corresponding to Steps S1 to S3 in the first embodiment), the residual quantity of electric power in the battery is detected by the battery residual quantity detector 570 (Step S34) and, upon arrival of the detected value at the predetermined value (Step S35), the blower motor 202 is stopped automatically (Step S36). Therefore, if the predetermined value is set to such a degree of value for not exhausting the battery 300, the blower fan 201 of the air conditioner 200 continues to rotate as long as possible, so that the interior of the cab 9 is kept comfortable by blowing of air with the blower fan.

Although in each of the above first to fourth embodiments, reference has been made to the power control device for the hydraulic excavator as an example of construction machine, the scope of application of the present invention is not limited thereto, but the present invention is also applicable to a power control device for another construction machine such as a wheel crane.

INDUSTRIAL APPLICABILITY

As described above, the present invention is useful for a power control device for a construction machine such as a hydraulic excavator or a crane. Particularly, the present invention is suitable for a power control device for a construction machine provided with engine stop means for stopping an engine automatically and an air conditioner for conditioning the air in an interior of a cab.

What is claimed is:

1. A power control device for a construction machine including an engine, an actuator adapted to be driven with power of said engine, engine stop means for stopping said engine automatically when it is not necessary to drive said actuator, and an air conditioner for conditioning the air in an interior of a cab of the construction machine, said power control device comprising engine power necessity determining means for determining whether the power is necessary or not, air conditioner operation detecting means for detecting whether said air conditioner is in operation or not, and air conditioner operation maintaining means for maintaining at least a state of minimum operation of said air conditioner when said air conditioner operation detecting means detects that said air conditioner is in operation and even when said engine power necessity determining means determines that the power is not necessary.

2. The power control device for the construction machine according to claim 1, wherein said air conditioner is driven by the power of said engine and said air conditioner operation maintaining means is configured so as to prevent the engine from stopping by said engine stop means when said air conditioner operation detecting means detects that said air conditioner is in operation and even when said engine power necessity determining means determines that the power is not necessary.

3. The power control device for the construction machine according to claim 1, further comprising an auxiliary power source which generates a smaller power than the power of said engine, and wherein said air conditioner operation maintaining means is configured so as to drive said air conditioner with the power of said auxiliary power source when said air conditioner operation detecting means detects that said air conditioner is in operation.

4. The power control device for the construction machine according to claim 1, further comprising a battery, and wherein said air conditioner has a blower fan driven with electric power supplied from said battery and is configured so that said engine is stopped automatically by said engine stop means when said engine power necessity determining means determines that the power of said engine is not necessary, and said air conditioner operation maintaining means is configured so as to stop an operation of said blower fan upon lapse of a predetermined time after the engine is stopped.

5. The power control device for the construction machine according to claim 1, further comprising a battery and battery supply electric power detecting means for detecting a residual quantity of electric power supplied by said battery, and wherein said air conditioner has a blower fan driven with said electric power supplied from said battery and is configured so that said engine is stopped by said engine stop means when said engine power necessity determining means determines that the power of said engine is not necessary, and said air conditioner operation maintaining means is configured so as to stop an operation of said blower fan when said battery supply electric power detecting means detects that the residual quantity of said electric power supplied by said battery is smaller than a predetermined value.

6. A power control device for a construction machine, comprising an engine, an actuator adapted to be driven with power of said engine, engine stop means for stopping said engine automatically when it is not necessary to drive said actuator, an air conditioner for conditioning the air in an interior of a cab of the construction machine, air conditioner operation detecting means for detecting whether said air conditioner is in operation or not, engine power necessity determining means for determining whether the power of said engine is necessary or not on the basis of both operation information provided from said air conditioner operation detecting means and information on operation provided from operating means, and air conditioner operation maintaining means for maintaining at least a state of minimum operation of said air conditioner when said air conditioner operation detecting means detects that said air conditioner is in operation and even when said engine power necessity determining means determines that the power is not necessary.

* * * * *